United States Patent [19]

Fischer et al.

[11] Patent Number: 4,906,696
[45] Date of Patent: Mar. 6, 1990

[54] TRANSPARENT, THERMOPLASTICALLY PROCESSABLE POLYMER BLENDS MADE OF AN AROMATIC POLYCARBONATE AND A METHYACRYLATE POLYMER

[75] Inventors: Jens-Dieter Fischer, Darmstadt; Werner Siol, Darmstadt-Eberstadt, both of Fed. Rep. of Germany

[73] Assignee: Rohm GmbH Chemische Fabrik, Darmstadt, Fed. Rep. of Germany

[21] Appl. No.: 202,840

[22] Filed: Jun. 6, 1988

[30] Foreign Application Priority Data

Jun. 6, 1987 [DE] Fed. Rep. of Germany ....... 3719239

[51] Int. Cl.$^4$ .............................................. C08L 69/00
[52] U.S. Cl. .................................. 525/148; 525/146; 525/468
[58] Field of Search ........................ 525/148, 146, 468

[56] References Cited

FOREIGN PATENT DOCUMENTS

| | | |
|---|---|---|
| 0097948 | 1/1984 | European Pat. Off. . |
| 0199824 | 11/1984 | European Pat. Off. . |
| 0144231 | 6/1985 | European Pat. Off. . |
| 0173146 | 8/1985 | European Pat. Off. . |
| 2264268 | 7/1973 | Fed. Rep. of Germany . |
| 2329585 | 1/1975 | Fed. Rep. of Germany . |
| 3518538 | 11/1986 | Fed. Rep. of Germany . |
| 2167650 | 1/1973 | France . |
| 2553919 | 9/1984 | France . |
| 58-13652 | 1/1983 | Japan . |
| 61-76509 | 4/1986 | Japan . |
| 1394481 | 5/1975 | United Kingdom . |
| 1452141 | 10/1976 | United Kingdom . |

OTHER PUBLICATIONS

*Feinwerktechnik & Messtechnik*, 1985, vol. 93, pp. 305–308, "Substrate Aus Transparenten Kunststoffen Fur Optische Speicherplatten", Dr. J. Hennig.

*Primary Examiner*—Theodore E. Pertilla
*Attorney, Agent, or Firm*—Oblon, Spivak, McClelland, Maier & Neustadt

[57] ABSTRACT

Transparent, thermoplastically processable polymer blends of (A) polycarbonates, especially Bisphenol A polycarbonates, and (B) methyacrylate copolymers are disclosed. They are prepared from 95 to 5 wt. % methyl methacrylate and 5 to 95 wt. % methacrylic esters and optionally 0 to 30 wt. % especially 1 to 25 wt. % of an acrylic ester with carbocyclic groups in the ester group, and which can also contain other polymer building blocks in amounts of 0 to 40 wt. % formed from $\alpha,\beta$-unsaturated monomers.

11 Claims, No Drawings

TRANSPARENT, THERMOPLASTICALLY PROCESSABLE POLYMER BLENDS MADE OF AN AROMATIC POLYCARBONATE AND A METHYACRYLATE POLYMER

BACKGROUND OF THE INVENTION

1. Field of the Invention:

The invention relates to polymer blends, in particular polymer blends of aromatic polycarbonate and methacrylate polymers or copolymers.

2. Discussion of the Background:

Polymer blends containing an aromatic polycarbonate as one component and a vinyl polymer as another component are known. According to German Patent Publication 23 29 585, pages 11 to 12, completely homogenous and transparent polycarbonate molding composition blends are obtained when an aromatic polycarbonate of 2,2-bis(3,5-dimethyl-4-hydroxyphenyl)propane, which is an o,o,o',o'-tetraalkylated bisphenol, is mixed, for example, with polystryene as a thermoplastic resin.

In contract to this, according to this German Patent Publication, a mixture of 2,2-bis(4-hydroxyphenyl)-propane polycarbonate, which is the polycarbonate of Bisphenol A, and polystyrene, comprises two phases. Other thermoplastic resins that behave like polystyrene in these mixtures, as described in the German Patent Publication at pages 5 and 6, are homopolymers and copolymers of acrylic and methacrylic compounds such as, for example, methyl acrylate, ethyl acrylate, methyl methacrylate, and cyclohexyl methacrylate.

Polymethyl methacrylate, a glass-clear, transparent plastic, with the polycarbonate of Bisphenol A, a likewise transparent plastic, does not give homogenous transparent alloys. As disclosed among other features in Japanese Patent Publication 72 16 063, these mixtures have an opalescent luster.

According to German Patent Publication 22 64 268, an improved polycarbonate molding composition is obtained when a low molecular weight acrylic polymer which is a copolymer consisting of 90 to 75 wt. % methyl methacrylate and 10 to 25 wt. % of an alkyl acrylate with the formula $CH_2=C(X)-COOR$, with X being H or $CH_3$ and R being an organic group with 4 to 12 carbon atoms, is added to the polycarbonate. The amount of copolymer additive can be 0.01 to approximately 50 wt. % of the weight of the polycarbonate composition. Increasing addition of copolymer steadily reduces the melt viscosity of the polycarbonate or of the mixture without impairing the transparency.

These copolymers are therefore polymeric plasticizers whose molecular weight to produce the described compatibility, based on our own experiments with appropriate copolymers, has to be below 15,000. However, such copolymers are completely unsuitable for producing polymer alloys that also have industrially interesting properties in the range of high polymethacrylate fractions, because of the known decline in mechanical properties in the molecular weight range below 100,00, especially below 50,000 (see Plastics Manual, Volume IX, Vieweg/Esser: Polymethacrylates, pages 112 ff).

Compatible polymer blends that consist of a polycarbonate such as bisphenol A polycarbonate and a copolymer of monomeric esters of acrylic and/or methacrylic acid with $C_1$-$C_{10}$ alcohols and a UV-absorbing monomer of the formula $$H_2C=\underset{\underset{R_1}{|}}{C}-\overset{\overset{O}{\|}}{C}-Y-Z,$$

in which $R_1$ stands for hydrogen or a methyl group and Y stands for oxygen or an $NR_2$ group with $R_2$ being a hydrogen or an alkyl group and Z being a UV-absorbing group, namely a 2-hydroxyphenyl-benzotriazole group a 2-hydroxybenzophenone or acetophenone group, or an α-cyano-β,β-diphenyl group, are described in German Application P 35 18 538.4.

Such polymer blends of polycarbonate and copolymers of methyl methacrylate and monomers with pronounced absorption power for ultraviolet radiation, which can also be processed as thermoplastics and which are used as optical screening agents to improve the light resistance of plastics, for example, especially by coating them, are polymer blends with only special uses. Because of the high cost of the UV absorbers compounded with them, these blends are prohibitively expensive and cannot be used as widely usable, thermoplastically processable compositions.

Thermoplastically processable methyl methacrylate copolymers with methacrylamides as comonomers that are substituted on the amide nitrogen with an organic group of a cyclic molecule, which also have no distinct UV absorption power, are described in German Application P 36 32 946.0. These copolymers form transparent, thermoplastically processable polymer blends with polycarbonates, especially Bisphenol A polycarbonates.

Thermoplastic molding compositions as polymer blends of a polycarbonate, a copolymer of styrene, methyl methacrylate, and N-phenylmaleimide, and a graft polymer of methyl methacrylate on rubber, are not compatible, according to European Patent Publication 173 146. In the same way, the polymer blends disclosed by European Patent Publication 144 231 made up of a polycarbonate and a copolymer of methyl methacrylate/N-phenylmaleimide and/or an EPDM-g-methyl methacrylate/N-phenylmaleimide copolymer, are not fully compatible.

Transparent, thermoplastically processable polymer blends of aromatic polycarbonates, especially the polycarbonate of Bisphenol A, and a methacrylate copolymer that is made up of methyl methacrylate units and N-cyclohexylmaleimide units, are described in German Application P 37 09 562.5. Other additional monomers can also optionally be used to construct the methacrylate copolymer, in amounts of 0 to 40 wt. %, such as cycloalkyl or alkyl esters of acrylic or methacrylic acid, among others. The polymer blends, like those from 0 36 32 946.0, in comparison with the individual components, namely Bisphenol A polycarbonate or polymethyl methacrylate, can be used beneficially as optical resin materials because of their low optical birefringence and/or reduced water uptake.

Polymer blends of aromatic polycarbonate and methyl methacrylate copolymers with comonomer building blocks containing nitrogen also show properties that detract in particular from their use as optical resin materials. It has long been known of polymer materials containing nitrogen that changes occur during their thermoplastic processing, especially in the presence of $O_2$, with the extruded or injection molded parts obtaining a discolored yellow color.

The problem therefore exists of finding transparent, thermoplastically processable polymer blends made up of aromatic polycarbonate and a polymer that is made up of methyl methacrylate in high proportions, with the methyl methacrylate polymer being modified by the incorporation of other monomers so that it becomes compatible with the polycarbonate. The new blends prepared in this way would no longer have the deleterious properties that have appeared heretofore.

SUMMARY OF THE INVENTION

Accordingly, it is an object of this invention to provide thermoplastically processable molding compositions that are compatible polymer blends of polycarbonates and polymers prepared by copolymerization of methyl methacrylate with acrylic and/or methacrylic esters containing carbocyclic groups.

It is another object of this invention to provide transparent, thermoplastically processable blends of an aromatic polycarbonate and a methacrylate copolymer.

It is another object of this invention to provide thermoplastically processable molding compositions that are compatible polymer blends of polycarbonates and polymers prepared by copolymerization of methyl methacrylate with methacrylic and optionally acrylic esters containing carbocyclic groups such as cyclohexyl or phenyl groups in the ester group, and optionally other monomers such as styrene and particularly α-methylstyrene or other methacrylic or acrylic esters.

The inventors have now discovered a transparent thermoplastically processable polymer blend which satisfies all of the above objects of the invention, and other objects which will become apparent from the description of the invention given herein below. This transparent, thermoplastically processable polymer blend comprises (A) an aromatic polycarbonate and (B) a methacrylate copolymer. The methacrylate copolymer (B) comprises:

(1) 95 to 5 wt. %, preferably 95 to 20 wt. %, of methyl methacrylate units, and optionally at least one other α,β-unsaturated monomer unit in an amount of from 0 to 40 wt. %; and (2) 5 to 95 wt. %, preferably 5 to 80 wt. %, of at least one methacrylic and optionally 0 to 30 wt. %, especially 1 to 25 wt. %, acrylic ester unit with a carbocyclic group in the ester group, having formula (I)

$$H_2C=C(R_1)-CO-O-X \qquad (I)$$

wherein:
$R_1$ is H or $CH_3$, and
X is Y or A-Y; wherein
Y is $C_{5-12}$ cycloalkyl, a monoalkyl-substituted cycloalkyl group with a total of 5 to 12 carbon atoms, a polyalkyl-substituted cycloalkyl group with a total of 5 to 12 carbon atoms, a $C_{6-12}$ aryl group, an alkyl-substituted aryl group containing a total of 6 to 12 carbon atoms, or an oxyalkyl-substituted aryl group containing a total of 6 to 12 carbon atoms;
A is a linear $C_{1-6}$ alkylene group or a $C_{2-6}$ branched alkylene group, or A is a linear $C_{2-4}$ oxyalkylene group or a $C_{2-4}$ branched oxyalkylene group; and (3) wherein said methacrylate copolymer (B) has a molecular weight, Mw, of above 30,000.

The weight % values given above are taken as a weight percentage of copolymer (B).

The alkyl substituents in the groups provided for variable Y contain 1 to 6 carbon atoms and are either linear or branched.

DETAILED DESCRIPTION OF THE PREFERRED EMBODIMENTS

It has been found that glass-clear polymethacrylic resins with plastic properties and polycarbonates such as the polycarbonate of Bisphenol A, which in turn is one of the impact-resistant transparent plastics, surprisingly, according to the criteria apparent for "compatible polymers" in Polymer Handbook, Second Edition, 1975, III, 211 to 213, can be alloyed into compatible and again glass-clear new plastics. This has been found to be possible when copolymers are used as polymethacrylate resins that are made up of 95 to 5 wt. %, especially 95 to 20 wt. % methyl methacrylate and 5 to 95 wt. %, especially 5 to 80 wt. % of an methacrylic and optionally 0 to 30 wt. %, especially 1 to 25 wt %, acrylic ester with a carbocyclic group in the ester group.

The carbocyclic group is aliphatic or aromatic, and can have other substituents, especially alkyl groups. The carbocyclic group in the ester group of the acrylic or methacrylic compound can be bonded directly to the ester oxygen atom, or it can be bonded to it through other groups, especially through alkylene groups.

In the preparation of the copolymer, other α,β-unsaturated monomers can also be used in addition, such as α-methylstyrene and/or other methacrylic or acrylic compounds in particular, especially their esters. These α,β-unsaturated monomers can be used in amounts of 0 to 40 wt. %, preferably in amounts of 2.5 to 40 wt. %, and most preferably in amounts of 5 to 35 wt. %. Surprisingly, the polymer blends provided by the present invention are compatible over the entire range of alloys, i.e., with ratios of aromatic polycarbonate (A): polymethyacrylate copolymer (B) of 99.1:0.9 to 0.9:99.1, in percent by weight. Alloys of particular industrial interest however contain more than 5 wt. %, and especially more than 10 wt. % of one component or the other.

The fact that methyl methacrylate copolymers of the type indicated produce compatible polymer blends with high optical qualities with polycarbonates, especially the polycarbonate of Bisphenol A, pursuant to the invention, was not expected and is surprising according to the state of the art, and particularly according to the German Patent Publication 23 29 585 discussed above.

The compatibility of polycarbonate and polymethyacrylate resin pursuant to the invention is brought about by copolymerizing methacrylic and optionally crylic esters of the general formula $$\begin{array}{c} R_1 \ O \\ | \ \| \\ H_2C-C-C-O-X, \end{array} \qquad I$$

in which
$R_1$ is H or $CH_3$ and
X is Y or A-Y, with
Y is a $C_{5-12}$ cycloalkyl group, a monoalkyl-substituted cycloalkyl group containing a total of 5 to 12 carbon atoms, a polyalkyl-substituted cycloalkyl group containing a total of 5 to 12 carbon atoms, a $C_{6-12}$ aryl group, an alkyl-substituted aryl group containing a total of 6 to 12 carbon atoms, or an oxyalkyl-substituted aryl group containing a total of 6 to 12 carbon atoms, and A is a linear $C_{1-6}$ alkylene group, a branched $C_{2-6}$ alkylene group, or a linear $C_{2-4}$ oxyalkylene group or a branched $C_{2-4}$ oxyalkylene group; as comonomers in the polymethacrylate resin in amounts of 5 to 95 wt. %.

Examples of such acrylic and methacrylic esters with carbocyclic groups in the ester group include cyclopentyl methacrylate, cyclohexyl acrylate, cyclohexyl methacrylate, 3,3,5-trimethylcyclohexyl methacrylate, 4-t-butylcyclohexyl acrylate, 4-t-butylcyclohexyl methacrylate, 3-cyclohexylpropyl methacrylate, phenyl methacrylate, 4-t-butylphenyl methacrylate, 4-methoxyphenyl methacrylate, benzyl methacrylate, 1-phenylethyl methacrylate, 2-phenylethyl acrylate, 2-phenylethyl methacrylate, 3-phenylpropyl acrylate, 3-phenylpropyl methacrylate, 2-phenoxyethyl methacrylate, and 2-naphthyl methacrylate.

This invention therefore provides a transparent, thermoplastically processable polymer blend comprising:

(A) an aromatic polycarbonate and
(B) a methacrylate copolymer, with the copolymer (B) comprising:
(1) 95 to 5 wt. %, especially 95 to 20 wt. % methyl methacrylate units and optionally other $\alpha,\beta$-unsaturated monomer units in amounts of 0 to 40 wt. %, especially 2.5 to 40 wt. %, and
(2) 5 to 95 wt. %, especially 5 to 80 wt. % methacrylic and optionally 0 to 30 wt. %, especially 1 to 25 wt. %, crylic ester units with carbocyclic groups in the ester group of Formula I

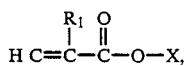

in which
$R_1$ is H or $CH_3$ and
X is Y or A-Y, with
  Y being a cycloalkyl group or a monoalkyl-substituted or polyalkyl-substituted cycloalkyl group with a total of 5 to 12 carbon atoms, or an optionally alkyl-substituted or oxyalkyl-substituted aryl group with a total of 6 to 12 carbon atoms, and
  A is an alkylene group that can be linear or branched, with 1 to 6 carbon atoms, or an oxyalkylene group which can be linear or branches, with 2 to 4 carbon atoms, and
(3) wherein the copolymer (B) has a molecular weight, Mw, above 30,000.

The polycarbonate (A) in particular is the reaction product of 2,2-bis(4-hydroxyphenyl)propane, known as Bisphenol A, and phosgene.

In one embodiment Y is a $C_5$ or $C_6$ cycloalkyl residue or a simple or multiple $C_1$ to $C_6$ alkyl substituted $C_5$ or $C_6$ cycloalkyl residue with a total of 6 to 12 carbon atoms, or possibly a $C_1$ to $C_6$ alkyl or $C_1$ to $C_6$ oxyalkyl substituted with an aryl residue having a total of 6 to 12 carbon atoms.

Specific examples for A include:

$$—CH_2—$$

$$—CH_2—CH_2—$$

$$—CH_2—CH_2—O—$$

$$—CH_2—CH_2—O—CH_2—CH_2—O—$$

-continued

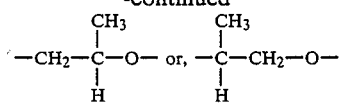

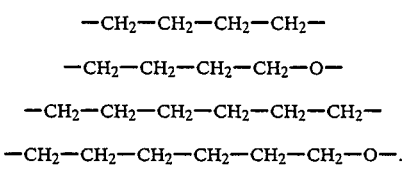

A can contain 0, 1 or 2 oxygen atoms.

The copolymer (B) and the monomers of Formula I copolymerized i it are distinguished from the copolymers and monomers described in German Application P 35 18 538.4 by the fact that they have no substantial absorption in the entire visible range into the UV range of 340 nm.

The polymethacrylate resins compatible with polycarbonates, especially the polycarbonate of Bisphenol A, are beneficially composed essentially of methyl methacrylate.

The methacrylate polymer pursuant to the invention contains copolymerized methacrylic and optionally 0 to 30 wt. %, especially 1 to 25 wt. %, acrylic units of the structure I indicated above, in amounts of 5 to 95 wt. %. The copolymer can contain other units of $\alpha,\beta$-unsaturated monomers such as styrene, $\alpha$-methylstyrene, acrylic acid, or methacrylic acid or their alkyl esters with 2 to 10 carbon atoms in the ester group, in which the alkyl groups can also be branched, in amounts of 0 to 40 wt. %, especially in amounts of 2.5 to 40 wt. %, and above all in amounts of 5 to 35 wt. %.

These statistically constructed copolymers are prepared by known procedures for the polymerization of $\alpha,\beta$-unsaturated compounds, especially radical polymerization, for example in bulk or solution or by suspension polymerization. Azo compounds such as azobisisobutyronitrile, or peroxides such as dibenzoyl peroxide, dilauroyl peroxide, or redox systems can be used as radical polymerization initiators for this purpose, or the initiating radicals can be produced by radiation chemistry. (Cf. H. Rauch Punttigam, Th. Völker "Acrylic and Methacrylic Compounds," Springer Verlag 1967).

It is known that the compatibility of polymers in blends depends on their degrees of polymerization. As a rule the compatibility decreases with increasing molecular weight of the polymers, with the blend then becoming two-phased or multiphased. Methacrylate copolymers that have molecular weights, Mw, in g per mole, as can be determined, for example, by using gel permeation chromatography or by the light-scattering method, above 30,000, from approximately 30,000 250,000, preferably approximately 50,000 to 150,000, and whose reduced viscosities $\eta$ spec/c measured in accordance with DI 51 562 in chloroform as the solvent are in the range of 18 to 65 ml/g, preferably in the range of 30 to 50 ml/g, are used to prepare polycarbonate-polymethacrylate alloys of the invention. The copolymers with molecular weight thus controlled are prepared particularly by polymerization in the presence of molecular weight regulators. Mercaptans which are well known for this purpose (in this regard, see Houben-Weyl, der organischen Chemie, Volume XIV/1, 1961, page 66) can be used, for example.

Thus, for example, methyl methacrylate copolymers with 5 to 50 wt. % cyclohexylemethacrylate and an $\eta$ spec/c of 40 to 45 ml/g are compatible with Bisphenol A polycarbonate, for example Makrolon ® 1189, which has an $\eta$ spec/c of 43 ml/g (measured in chloroform), over the entire range of alloys. Methacrylate resins consisting of 100 wt. % phenyl methacrylate or those made up predominantly of phenyl methacrylate are likewise compatible with Bisphenol A polycarbonate, for example Makrolon ® 1189 or Makrolon ® 3100, over the entire range of alloys.

The polycarbonate-compatible methacrylate copolymers pursuant to the invention can be processed thermoplastically into glass-clear, colorless molded objects that have Vicat softening points, VET, of approximately 100° to 130° C. measured according to DIN 53 460.

Aromatic polycarbonates, especially polycarbonates of Bisphenol A, are used as polycarbonates compatible with the methacrylate copolymers pursuant to the invention.

Polycarbonates of Bisphenol A are glass-clear, tough plastics, and are marketed under the trade name, for example, of Makrolon ®. The molecular weights, Mw (see above in this regard) of the carbonate polymers on which these plastics are based are in the range of approximately 20,000 to 60,000, especially 20,000 to 40,000, and the Vicat softening points, VET, of these plastics are 140° C., measured according to DIN 53 460.

By alloying the two types of plastics, a transparent plastic system is obtained with properties that are different, especially more desirable, from those shown by the individual plastics prior to alloying.

For example, the thermoplastic processing of poly-Bisphenol A carbonate, which has a high melt viscosity as a characteristic of the material, can be facilitated by alloying thermoplastic polymethyacrylate plastic without changing substantially the other properties of the polycarbonate, as is known to happen by alloying low molecular weight acrylic polymers.

The Vicat thermal dimensional stability (VET according to DIN 43 560) and the glass transition temperatures $T_g$ correlated with this (measured by the TLC method, in this regard see Polymer Handbook, 2nd Edition, III, pages 139-141) of the polymethacrylic resins to be used pursuant to the invention, with values of approximately 100° to 130° C., are generally clearly higher than those of customary, commercial polymethacrylate molding compositions, whose values are approximately 100° C.

The alloys pursuant to the invention surprisingly show thermal dimensional stabilities over the entire range of blends, or over a broad range of blends, that are generally only a few degrees of temperature lower than those of the individual plastics, especially the polycarbonate of Bisphenol A which is distinctly more heat-resistant than polymethyl methacrylate.

Blends of the polymeric components (A) and (B) can be processed as a granulate by extrusion or injection molding into the widest variety of molded objects consisting of the polymer blends pursuant to the invention. Examples that may be mentioned are disks, hollow-chamber discs, molded objects for optical purposes such as lenses or prisms, or optical waveguides or reflectors, and optically readable data carriers.

Hollow chamber plates, e.g., as bridge double plates, from the polymer mixture according to the invention are useful for the building trade due to their good mechanical properties. Optically readable data memories have so far been produced from polycarbonate. Those show a relatively high double breakage. Disks from PMMA have a too high water retention, they warp.

The new polymer mixtures have, compared to the materials of the state of the art, a reduced double breakage, which provides for a higher memory density, and they are more dimensionally stable.

The polymeric materials used today for their production, and other purposes, such as Bisphenol A polycarbonate or polymethyl methacrylate, cause problems relative to optical birefringence or water uptake. The materials pursuant to the invention show distinct advantages here, including over the alloys that can be prepared with methacrylate copolymers prepared with comonomers containing nitrogen.

Films or molded objects of the polymer blends pursuant to the invention can be prepared by casting solutions containing the polymeric components (A) and (B).

Other features of the invention will become apparent in the course of the following descriptions of the exemplary embodiments which are given for illustration of the invention and are not intended to be limiting thereof.

EXAMPLES

A. Examples 1-15:

Preparation of methacrylate (co)polymers

Example 1:

0.2 parts by weight of dilauroyl peroxide (as initiator) and 0.7 parts by weight of dodecylmercaptan as molecular weight regulator are added with stirring to a mixture of 80 parts by weight of methyl methacrylate (MMA) and 20 parts by weight of cyclohexyl methacrylate (CHMA). This solution is polymerized in a film tube in a water bath for 3 h at 55° C. and for 16 h at 50° C., and is tempered for 3 h at 110° C. in a drying oven for the final polymerization. The polymer thus obtained and used to prepare polymer blends according to Examples 16-20 is colorless and completely transparent. The average molecular weight was found to be Mw=75,000 and the glass transition temperature Tg was 108° C.

Example 2:

A mixture of 78 parts by weight of MMA, 20 parts by weight of CHMA, and 2 parts by weight of cyclohexyl acrylate (CHA) was polymerized as in Example 1 with 0.2 parts by weight of dilauroyl peroxide and 0.7 parts by weight of dodecylmercaptan. The polymer resulting from this and used to prepare polymer blends according to Examples 21-25 is colorless and completely transparent. The average molecular weight was found to be Mw=78,000 and the glass transition temperature was Tg=105° C.

Example 3:

0.1 parts by weight of 2,2'-bis(t-butylperoxy)butane and 0.4 parts by weight of t-butyl peroctoate are added as initiators to a mixture of 80 parts by weight of MMA, 10 parts by weight of CHMA, and 10 parts by weight of α-methylstyrene (α-MS), and 0.8 parts by weight of dodecylmercaptan is added as molecular weight regulator. This solution is polymerized in a film tube in a water bath for 65 h at 60° C. and 24 h at 62° C., and is tempered for 10 h at 125° C. for the final polymerization. The polymer thus obtained and used to prepare polymer blends according to Examples 26-30 is colorless and completely transparent. The average molecular weight is Mw=80,000, and the glass transition temperature is Tg=121° C.

Example 4:

0.4 parts by weight of t-butyl perpivalate, 0.15 parts by weight of 2,2'-azobis(isobutyronitrile), and 0.4 parts by weight of dilauroyl peroxide and 2,2'-bis(t-butylperoxy)butane are dissolved in a mixture of 75 parts by weight of MMA, 10 parts by weight of CHMA, 10 parts by weight of α-MS, and 5 parts by weight of CHA and 0.44 parts by weight of dodecylmercaptan is dissolved in the mixture as molecular weight regulator. This solution is polymerized in a water bath as in the preceding examples for 70 h at 65° C., and is tempered for 7 h at 100° C. and 10 h at 125° C. in a drying oven for the final polymerization. The resulting colorless and completely clear polymer has an average molecular weight Mw=125,000 and is used to prepare polymer blends according to Examples 31-35.

Example 5:

0.2 parts by weight of dilauroyl peroxide and 0.55 parts by weight of dodecylmercaptan are dissolved in 90 parts by weight of MMA and 10 parts by weight of 4-t-butylcyclohexyl methacrylate. This solution is polymerized in a film tube in a water bath for 8 h at 50° C., and is tempered for 3 h at 110° C. for the final polymerization. The average molecular weight of the colorless and completely transparent polymer, which is used to prepare polymer blends according to Examples 36-40, is Mw=95,000.

Example 6:

0.2 parts by weight of dilauroyl peroxide and 0.62 parts by weight of dodecylmercaptan are added to a mixture of 90 parts by weight of MMA and 10 parts by weight of 3-cyclohexylpropyl methacrylate.

This solution is polymerized as in Example 5 for 19 h at 50° C. in a water bath, and is tempered for 3 h at 110° C. for the final polymerization. The polymer used to prepare polymer blends according to Examples 41-45 is colorless, completely clear, and has an average molecular weight of Mw=89,000.

Example 7:

0.2 parts by weight of dilauroyl peroxide and 0.55 parts by weight of dodecylmercaptan are dissolved in a mixture of 75 parts by weight of MMA and 25 parts by weight of phenyl methacrylate (PhMA). The solution is polymerized as in the preceding examples in a water bath for 18 h at 50° C. and 22 h at 60° C., and is tempered for 3 h at 110° C. for the final polymerization. The polymer is colorless and transparent and has an average molecular weight of Mw=84,000, a glass transition temperature Tg=110° C., and a Vicat softening point VET=107° C., and is used to prepare polymer blends according to Examples 46-50.

Example 8:

A solution otherwise similar to Example 7 with 0.3 parts by weight of dodecylmercaptan as molecular weight regulator is polymerized in a film tube in a water bath for 17 h at 60° C. and is tempered for 12 h at 110° C. for the final polymerization. The polymer used to prepare polymer blends according to Examples 51-55 is colorless, completely clear, and has an average molecular weight Mw=149,000.

Example 9:

0.2 parts by weight of dilauroyl peroxide and 0.5 parts by weight of dodecylmercaptan are dissolved in 100 parts by weight of PhMA. This solution is polymerized as in the preceding Examples for 66 h at 50° C., and is tempered for 12 h at 110° C. for the final polymerization. The polymer is colorless and transparent and has an average molecular weight Mw=78,000, and is used to prepare polymer blends according to Examples 56-60.

Example 10:

0.4 parts by weight of t-butyl perpivalate, 0.1 parts by weight of 2,2'-azobis(isobutyronitrile), 0.37 parts by weight of dilauroyl peroxide, 0.3 parts by weight of t-butyl peroctoate, and 0.05 parts by weight of 2,2'-bis(t-butylperoxy)butane are dissolved as initiators in a mixture of 60 parts by weight of MMA, 20 parts by weight of α-MS, and 20 parts by weight of PhMA, and 0.55 parts by weight of dodecylmercaptan is dissolved in the mixture as molecular weight regulator. This solution is polymerized in a water bath in a film tube for 65 h at 60° C. and for 90 h at 65° C., and is tempered for 12 h at 110° C. for the final polymerization. The polymer used to prepare polymer blends according to Examples 61-65 is colorless, completely clear, has a molecular weight Mw=89,000, and has a glass transition temperature Tg=117° C. and a Vicat softening point VET=112° C.

Example 11:

0.4 parts by weight of t-butyl perpivalate, 0.2 parts by weight of 2,2'-azobis(isobutyronitrile), 0.8 parts by weight of dilauroyl peroxide, and 0.05 parts by weight of 2,2'-bis(t-butylperoxy)butane are dissolved as initiators in a mixture of 55 parts by weight of MMA, 20 parts by weight of α-MS, 20 parts by weight of PhMA, and 5 parts by weight of CHA, and 0.45 parts by weight of dodecylmercaptan is dissolved in the mixture as molecular weight regulator. This solution is polymerized as in the preceding examples for 96 h at 65° C., and is tempered for 7 h at 100° C. and 10 h at 125° C. for the final polymerization. The polymer is colorless and transparent, it has an average molecular weight Mw=130,000, and it is used to prepare polymer blends according to Examples 66-70.

Example 12:

0.2 parts by weight of 2,2'-azobis(isobutyronitrile) and 0.05 parts by weight of 2,2'-bis(t-butyl-peroxy)butane are added as initiators to a mixture of 45 parts by weight of MMA, 45 parts by weight of PhMA, and 10 parts by weight of styrene, and 0.8 parts by weight of t-dodecylmercaptan is added to the mixture as molecular weight regulator. This solution is polymerized in a film tube in a water bath for 20 h at 55° C. and is tempered for 12 h at 110° C. for the final polymerization. The polymer used to prepare polymer blends according to Examples 71-75 is colorless, completely clear, and has an average molecular weight Mw=102,000.

Example 13:

0.2 parts by weight of dilauroyl peroxide (initiator) and 0.7 parts by weight of dodecylmercaptan are dissolved in a mixture of 90 parts by weight of MMA and 10 parts by weight of 2-phenylethyl methacrylate. This solution is polymerized as in the preceding examples for 3 h at 55° C. and 16 h at 50° C. in a water bath, and for 3 h at 110° C. in a drying oven for the final polymerization. The polymer thus obtained is colorless and transparent, and it has an average molecular weight of Mw=78,000 and a glass transition temperature of Tg=104° C., and is used to prepare polymer blends according to Examples 76-80.

Example 14:

0.2 parts by weight of dilauroyl peroxide and 0.51 parts by weight of dodecylmercaptan are added to a mixture of 90 parts by weight of MMA and 10 parts by weight of 3-phenylpropyl methacrylate (3-PPMA). This solution is polymerized in a film tube in a water bath for 3 h at 55° C. and for 60 h at 50° C., and is tempered for 3 h at 110° C. for the final polymerization. The polymer used to prepare polymer blends according to Examples 81-85 is colorless and transparent, has a glass transition temperature of Tg=103° C., and has an average molecular weight Mw=100,000.

Example 15:

A mixture of 88 parts by weight of MMA, 10 parts by weight of 3-PPMA, and 2 parts by weight of 3-phenylpropyl acrylate is polymerized as in Example 14 (the same initiator and regulator and the same amounts of them, as well as the same polymerization conditions). The resulting polymer is colorless and transparent and has an average molecular weight of Mw=100,000.

B. Examples 16-90:

Blends pursuant to the invention

Examples 16-20:

The copolymer prepared as in Example 1 is mixed in the specified ratios by weight with Makrolon® 1189 (both in granulated form), and is extruded as a tape on a single-screw mixing extruder. Tape samples are subjected to visual examinations, measurements of the glass transition temperature Tg by TLC (in this regard, see Polymer Handbook, 2nd Edition III, pages 139-141), measurements of the Vicat softening point VET according to DIN 53 460 on test platelets 3 mm thick (prepared from the extruded tapes on an Anker injection molding machine), and the cloud point (cloud temperature $T_{Tr}$ was determined on a Kofler heating bed, (Chem.-Inq-Techn. 1950, p. 289), which characterizes the homogeneous to heterogeneous phase transition of the mixture that depends on the blend composition: LCST behavior. (D. R. Paul, Polymer Blends and Mixtures, 1985, pages 1-3, Martinus Nijhoff Publishers, Dordrecht, Boston, Lancaster).

| Example No. | Makrolon/copolymer parts by wt.) | Appearance of the extrudate | Tg (Degrees C.) | VET (Deg. C.) | $T_{Tr}$ ± 15 (Deg. C.) |
|---|---|---|---|---|---|
| 16 | 90/10 | Clear, colorless | — | — | 224 |
| 17 | 70/30 | Clear, colorless | — | — | 219 |
| 18 | 50/50 | Clear, colorless | 117 | 119 | 226 |
| 19 | 30/70 | Clear, colorless | — | — | 246 |
| 20 | 10/90 | Clear, colorless | — | — | >260 |
| Compar. | Makrolon 1198 | Clear, colorless | 138 | 138 | |
| | Copolymer 1 | Clear, colorless | 108 | 110 | |

Dashes for measured data in this table, and those following, mean that no measurements were made.

Examples 21-25:

Makrolon® 1189 and the copolymer prepared according to Example 2 are mixed in the specified ratios by weight, extruded, and tested for $T_{Tr}$ as in Examples 16-20.

| Example No. | Makrolon/copolymer (parts by wt.) | Appearance of the extrudate | $T_{Tr}$ ± 15 (Degrees C.) |
|---|---|---|---|
| 21 | 90/10 | Clear, colorless | 216 |
| 22 | 70/30 | Clear, colorless | 212 |
| 23 | 50/50 | Clear, colorless | 218 |
| 24 | 30/70 | Clear, colorless | 238 |
| 25 | 10/90 | Clear, colorless | >260 |
| Compar. | Copolymer 2 (Tg 105 deg. C.) | | |

Examples 26-30

Makrolon® 1189 and the copolymer prepared as in Example 3 are M mixed, extruded, and tested for Tg and $T_{Tr}$ as in Examples 16-20.

| Example No. | Makrolon/copolymer | Appearance of the extrudate | Tg (Deg. C.) | $T_{Tr}$ ± 15 (Degrees C.) |
|---|---|---|---|---|
| 26 | 90/10 | Clear, colorless | — | 232 |
| 27 | 70/30 | Clear, colorless | — | 214 |
| 28 | 50/50 | Clear, colorless | 125 | 235 |
| 29 | 30/70 | Clear, colorless | — | 255 |
| 30 | 10/90 | Clear, colorless | — | >260 |
| Compar. | Copolymer 3 | Clear, colorless | 121 | |

Examples 31-35

Makronon® 1189 and the copolymer prepared as in Example 4 are mixed, extruded, and tested for $T_{Tr}$ as in Examples 21-25.

| Example No. | Makrolon/copolymer (parts by wt.) | Appearance of the extrudate | $T_{Tr}$ ± 15 (Degrees C.) |
|---|---|---|---|
| 31 | 90/10 | Clear, colorless | 186 |
| 32 | 70/30 | Clear, colorless | 178 |
| 33 | 50/50 | Clear, colorless | 175 |
| 34 | 30/70 | Clear, colorless | 188 |
| 35 | 10/90 | Clear, colorless | 245 |
| Compar. | Copolymer 4 | Clear, colorless | |

Examples 36-45

Makrolon® 1189 and the copolymer prepared as in Examples 5 and 6 are mixed in the specified ratios, extruded, and tested for $T_{Tr}$ as in Examples 21-25.

| Example No. | Makrolon/copolymer (parts by wt.) | Appearance of the extrudate | $T_{Tr} \pm 15$ (Degrees C.) |
|---|---|---|---|
| 36 | 90/10 | Clear, colorless | 196 |
| 37 | 70/30 | Clear, colorless | 190 |
| 38 | 50/50 | Clear, colorless | 186 |
| 39 | 30/70 | Clear, colorless | 192 |
| 40 | 10/90 | Clear, colorless | >260 |
| Compar. | Copolymer 5 | Clear, colorless | |
| 41 | 90/10 | Clear, colorless | 215 |
| 42 | 70/30 | Clear, colorless | 182 |
| 43 | 50/50 | Clear, colorless | 181 |
| 44 | 30/70 | Clear, colorless | 190 |
| 45 | 30/70 | Clear, colorless | >260 |
| Compar. | Copolymer 6 | Clear, colorless | |

Examples 46–50

Makrolon ® 1189 and the copolymer prepared as in Example 7 are mixed in the specified ratios, extruded, and tested for Tg, VET, and $T_{Tr}$ as in Examples 16–20.

| Example No. | Makrolon/copolymer (parts by wt.) | Appearance of the extrudate | Tg (Deg. C.) | VET (Deg. C.) | $T_{Tr} \pm 15$ (Deg. C.) |
|---|---|---|---|---|---|
| 46 | 90/10 | Clear, colorless | — | — | 260 |
| 47 | 70/30 | Clear, colorless | — | — | 250 |
| 48 | 50/50 | Clear, colorless | 119 | 114 | >260 |
| 49 | 30/70 | Clear, colorless | — | — | >260 |
| 50 | 10/90 | Clear, colorless | — | — | >260 |
| Compar. | Copolymer 7 | Clear, colorless | 110 | 107 | |

Examples 51–55

Makrolon ® 3100 and the copolymer prepared as in Example 8 are mixed in the specified ratios, extruded, and tested for $T_{Tr}$ as in Examples 21–25.

| Example No. | Makrolon/copolymer (parts by wt.) | Appearance of the extrudate | $T_{Tr} \pm 15$ (Degrees C.) |
|---|---|---|---|
| 51 | 90/10 | Clear, colorless | 224 |
| 52 | 70/30 | Clear, colorless | 229 |
| 53 | 50/50 | Clear, colorless | 240 |
| 54 | 30/70 | Clear, colorless | >260 |
| 55 | 10/90 | Clear, colorless | >260 |
| Compar. | Copolymer 8 | Clear, colorless | |
| Compar. | Makrolon ® 3100 (Tg 148 Deg. C.) | Clear, colorless | |

Examples 56–60

Makronon ® 1189 and the copolymer prepared as in Example 9 are mixed in the specified ratios, extruded, and tested for $T_{Tr}$ as in examples 21–25.

| Example No. | Makrolon/copolymer (parts by wt.) | Appearance of the extrudate | $T_{Tr} \pm 15$ (Degrees C.) |
|---|---|---|---|
| 56 | 90/10 | Clear, colorless | 223 |
| 57 | 70/30 | Clear, colorless | 216 |
| 58 | 50/50 | Clear, colorless | 225 |
| 59 | 30/70 | Clear, colorless | 240 |
| 60 | 10/90 | Clear, colorless | >260 |
| Compar. | Polymer 9 | Clear, colorless | |

Examples 61–65

Makrolon ® 1189 and the copolymer prepared as in Example 10 are mixed in the specified ratios, extruded, and tested for Tg, VET, and $T_{Tr}$ as in Examples 16–20.

| Example No. | Makrolon/copolymer (parts by wt.) | Appearance of the extrudate | Tg (Deg. C.) | VET (Deg. C.) | $T_{Tr} \pm 15$ (Deg. C.) |
|---|---|---|---|---|---|
| 61 | 90/10 | Clear, colorless | — | — | 235 |
| 62 | 70/30 | Clear, colorless | — | — | 232 |
| 63 | 50/50 | Clear, colorless | 125 | 118 | 250 |
| 64 | 30/70 | Clear, colorless | — | — | >260 |
| 65 | 10/90 | Clear, colorless | — | — | >260 |
| Compar. | Copolymer 10 | Clear, colorless | 117 | 112 | |

Examples 66–75

Makrolon ® 1189 and the copolymer prepared as in Examples 11 and 12 are mixed in the specified ratios, extruded, and tested for $T_{Tr}$ as in Examples 21–25.

| Example No. | Makrolon/copolymer (parts by wt.) | Appearance of the extrudate | $T_{Tr} \pm 15$ (Degrees C.) |
|---|---|---|---|
| 66 | 90/10 | Clear, colorless | 197 |
| 67 | 70/30 | Clear, colorless | 186 |
| 68 | 50/50 | Clear, colorless | 217 |
| 69 | 30/70 | Clear, colorless | 240 |
| 70 | 10/90 | Clear, colorless | >260 |
| Compar. | Copolymer 11 | Clear, colorless | |
| 71 | 90/10 | Clear, colorless | 208 |
| 72 | 70/30 | Clear, colorless | 196 |
| 73 | 50/50 | Clear, colorless | 207 |
| 74 | 30/70 | Clear, colorless | 236 |
| 75 | 10/90 | Clear, colorless | >260 |
| Compar. | Copolymer 12 | Clear, colorless | |

Examples 76–85

Makrolon ® 1189 and the copolymer prepared as in Examples 13 and 14 are mixed in the specified ratios, extruded, and tested for Tg and $T_{Tr}$ as in Examples 16–20.

| Example No. | Makrolon/copolymer (parts by wt.) | Appearance of the extrudate | Tg (Deg. C.) | $T_{Tr} \pm 15$ (Deg. C.) |
|---|---|---|---|---|
| 76 | 90/10 | Clear, colorless | — | 223 |
| 77 | 70/30 | Clear, colorless | — | 212 |
| 78 | 50/50 | Clear, colorless | 115 | 219 |
| 79 | 30/70 | Clear, colorless | — | 243 |
| 80 | 10/90 | Clear, colorless | — | >260 |
| Compar. | Copolymer 13 | Clear, colorless | 104 | |

-continued

| Example No. | Makrolon/ copolymer (parts by wt.) | Appearance of the extrudate | Tg (Deg. C.) | $T_{Tr} \pm 15$ (Deg. C.) |
|---|---|---|---|---|
| 81 | 90/10 | Clear, colorless | — | 207 |
| 82 | 70/30 | Clear, colorless | — | 194 |
| 83 | 50/50 | Clear, colorless | 112 | 206 |
| 84 | 30/70 | Clear, colorless | — | 228 |
| 85 | 10/90 | Clear, colorless | — | >260 |
| Compar. | Copolymer 14 | Clear, colorless | 103 | |

Examples 86-90

Makrolon ® 1189 and the copolymer prepared as in Example 15 are mixed in the specified ratios, extruded, and tested for $T_{Tr}$ as in Examples 21-25.

| Example No. | Makrolon/ copolymer (parts by wt.) | Appearance of the extrudate | $T_{Tr} \pm 15$ (Degrees C.) |
|---|---|---|---|
| 80 | 90/10 | Clear, colorless | 192 |
| 87 | 70/30 | Clear, colorless | 186 |
| 88 | 50/50 | Clear, colorless | 192 |
| 89 | 30/70 | Clear, colorless | 218 |
| 90 | 10/90 | Clear, colorless | >260 |
| Compar. | Copolymer 15 | Clear, colorless | |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transparent, monophasic thermoplastically processable polymer blend consisting essentially of (A) an aromatic polycarbonate and (B) a methacrylate copolymer, wherein said copolymer (B) comprises:
(i) 95 to 5 wt. % of methacrylate units; and
(ii) 5 to 95 wt. % of (iia) at least one methacrylic ester unit having a carbocyclic group in the ester group and (iib) 0 to 30 wt. % of an acrylic ester unit having a carbocyclic group in the ester group, wherein the units of (iia) and (iib) have a structure of formula (I):

$$H_2C=C(R_1)-CO-O-X$$

wherein:
$R_1$ is H or $CH_3$; and
X is Y or A-Y;
wherein Y is a $C_{5-12}$ cycloalkyl group, an alkyl-substituted cycloalkyl group containing a total of 5 to 12 carbon atoms, a polyalkyl-substituted cycloalkyl group containing a total of 5 to 12 carbon atoms, a $C_{6-12}$ aryl group, an alkyl-substituted aryl group containing a total of 6 to 12 carbon atoms, or an oxyalkyl-substituted aryl group containing a total of 6 to 12 carbon atoms; and A is a linear $C_{1-6}$ alkylene group, a $C_{2-6}$ branched alkylene group, or a linear $C_{2-4}$ oxyalkylene group or a branched $C_{2-4}$ oxyalkylene group;
(iii) wherein said copolymer (B) has an average molecular weight, $M_w$, of above 30,000 determined by gel permeation chromatography.

2. The blend of claim 1, wherein said copolymer (B) comprises:
(i) 95 to 20 wt. % of said methacrylate units; and
(ii) 5 to 80 wt. % of said units (iia) and (iib).

3. The blend of claim 1, wherein said copolymer (B) comprises:
(i) 95 to 5 wt. % of said methacrylate units; and from 0 to 40 wt. % of an $\alpha,\beta$-unsaturated monomer unit.

4. The blend of claim 1, wherein said copolymer (B), comprises:
(i) 95 to 20 wt. % of said methacrylate units; and from 0 to 40 wt. % of another $\alpha,\beta$-unsaturated monomer unit.

5. The blend of claim 1, wherein said copolymer (B) comprises up to 40 wt. % styrene, up to 40 wt. % of $\alpha$-methyl styrene units or up to 40 wt. % of styrene and $\alpha$-methyl styrene units.

6. The blend of claim 1, wherein said copolymer (B) comprises up to 40 wt. % of at least one acrylic ester unit other than a methylacrylic ester unit or up to 40 wt. % of at least one methacrylic ester unit other than a methyl methacrylate ester unit or up to 40 wt. % of the combination of at least one acrylic ester unit other than a methyl acrylic ester unit and at least one methacrylic ester unit other than a methyl methacrylic ester unit.

7. The blend of claim 1, wherein said carbonate (A) is the polycarbonate of 2,2-bis(4-hydroxyphenyl)-propane.

8. An optical article obtained from a transparent monophasic, thermoplastically processable polymer blend consisting essentially of (A) an aromatic polycarbonate and (B) a methacrylate copolymer, wherein said copolymer (B) comprises:
(i) 95 to 5 wt. % of methyl methacrylate units;
(ii) 5 to 95 wt. % of (iia) at least one methacrylic ester unit having a carbocyclic group in the ester group and (iib) 0 to 30 wt. % of an acrylic ester unit having a carbocyclic group in the ester group, wherein the units of (iia) and (iib) have a structure of formula (I):

$$H_2C=C(R_1)-CO-O-X$$

wherein:
$R_1$ is H or $CH_3$; and
X is Y or A-Y;
wherein Y is a $C_{5-12}$ cycloalkyl group, a monoalkyl-substituted cycloalkyl group containing a total of 5 to 12 carbon atoms, a polyalkyl-substituted cyclo-alkyl group containing a total of 5 to 12 carbon atoms, a $C_{6-12}$ aryl group, an alkyl-substituted aryl group containing a total of 6 to 12 carbon atoms, or an oxyalkyl-substituted aryl group containing a total of 6 to 12 carbon atoms; and A is a linear $C_{1-6}$ alkylene group, a branched $C_{2-6}$ alkylene group, a linear $C_{2-4}$ oxyalkylene group or a branched $C_{2-4}$ oxyalkylene group; and
(iii) wherein said copolymer (B) has an average molecular weight, Mw, of above 30,000 determined by gel permeation chromotography.

9. The optical article of claim 8, wherein said optical article is a disc, a hollow chamber disk, a lens, a prism, an optical waveguide, a reflector, or an optically readable data carrier.

10. The blend of claim 1, wherein said acrylic ester unit (iib) is present in 1 to 25 wt. %.

11. The optical article of claim 8, wherein said acrylic ester unit (iib) is present in 1 to 25 wt. %.

* * * * *